United States Patent
Takata (10) Patent No.: US 8,197,114 B2
(45) Date of Patent: Jun. 12, 2012

(54) CHASSIS FOR AN ILLUMINATING UNIT, AND AN ILLUMINATING UNIT, A DISPLAY DEVICE AND A TELEVISION RECEIVER INCORPORATING THE CHASSIS

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 11/914,993

(22) PCT Filed: Mar. 15, 2006

(86) PCT No.: PCT/JP2006/305078
§ 371 (c)(1), (2), (4) Date: Dec. 17, 2007

(87) PCT Pub. No.: WO2006/123472
PCT Pub. Date: Nov. 23, 2006

(65) Prior Publication Data
US 2009/0073675 A1     Mar. 19, 2009

(30) Foreign Application Priority Data
May 20, 2005 (JP) .................................. 2005-148575

(51) Int. Cl.
*F21V 7/04* (2006.01)
(52) U.S. Cl. ....... 362/634; 362/632; 362/633; 362/97.1; 362/97.2; 362/97.3; 362/97.4
(58) Field of Classification Search ........ 362/97.1–97.4, 362/632–634
See application file for complete search history.

(56) References Cited

U.S. PATENT DOCUMENTS

| | | | | |
|---|---|---|---|---|
| 6,654,088 B2 * | 11/2003 | Morishita et al. | ............. | 349/113 |
| 6,669,356 B2 * | 12/2003 | Okuno | ........................ | 362/600 |
| 2002/0149713 A1 * | 10/2002 | Ishida et al. | .................... | 349/58 |
| 2004/0062030 A1 * | 4/2004 | Yamada et al. | ................. | 362/31 |
| 2006/0072343 A1 * | 4/2006 | Shimizu | ........................ | 362/632 |

FOREIGN PATENT DOCUMENTS

| | | |
|---|---|---|
| JP | 4-40409 U | 4/1992 |
| JP | 11-337942 A | 12/1999 |
| JP | 2000-322915 A | 11/2000 |
| JP | 2000-331518 A | 11/2000 |
| JP | 2001-076527 A | 3/2001 |

OTHER PUBLICATIONS

Official communication issued in the International Application No. PCT/JP2006/305078, mailed on May 30, 2006.

* cited by examiner

*Primary Examiner* — William Carter
(74) *Attorney, Agent, or Firm* — Keating & Bennett, LLP (57) ABSTRACT

A chassis for an illuminating unit, and an illuminating unit, a display device and a television receiver incorporating the chassis are provided, in which optical sheets are supported in a state where their own weight and an external force are not concentrated at a certain portion thereof, preventing occurrence of wrinkles or deformed portions and falling-off of the optical sheets. A backlight chassis includes stand walls on the sides thereof on which optical sheets are to be placed, and locking pieces protruding from the stand wall on at least one of the sides, the side being a lower side in a normal state in use, and the locking pieces being arranged to lock a lower side of the optical sheets.

20 Claims, 7 Drawing Sheets

FIG. 4  Partial sectional view

CHASSIS FOR AN ILLUMINATING UNIT, AND AN ILLUMINATING UNIT, A DISPLAY DEVICE AND A TELEVISION RECEIVER INCORPORATING THE CHASSIS

BACKGROUND OF THE INVENTION

1. Field of the Invention

The present invention relates to a chassis for an illuminating unit, and an illuminating unit, a display device and a television receiver incorporating the chassis, and specifically relates to a chassis for an illuminating unit preferably applied to a display device or a television receiver having a translucent liquid crystal display panel, and an illuminating unit, a display device and a television receiver incorporating the chassis.

2. Description of the Related Art

Among flat-screen display devices, for example, a liquid crystal display device and other devices including a translucent liquid crystal display panel generally includes an illuminating unit placed behind the liquid crystal display panel. The illuminating unit includes a light source and optical sheets, controls the properties of light emitted from the light source using the optical sheets, and projects the light toward a back surface of the liquid crystal display panel. The light projected from the illuminating unit passes through the liquid crystal display panel, making an image displayed visible on a front surface of the liquid crystal display panel.

The optical sheets are interposed between the light source and the display panel, so that if the optical sheets suffer wrinkles or deformed portions, luminance irregularity or a shade caused by the wrinkles or the deformed portions appears on the liquid crystal display panel in some cases. Accordingly, it is necessary to keep the optical sheets in a state of having no wrinkle or deformed portion thereon in order to provide a display device that achieves high-definition image display.

Examples of a structure for supporting the optical sheets include a structure for supporting the optical sheets with through-holes provided at edge portions thereof, and into the through-holes, bosses are loosely fitted (see Japanese Patent Application Unexamined Publication No. Hei11-337942) and a structure for supporting the optical sheets with positioning pieces extending at the edge portions thereof, and the positioning pieces are engaged into concave portions provided on a chassis or a frame (see Japanese Patent Application Unexamined Publication No. 2001-76527). According to the above-described structures, the optical sheets can be positioned and held so as not to fall off a predetermined area.

However, with the above-described structures, if the display device is used in an upright position, the optical sheets are subjected to their own weight at the peripheries of the through-holes or the positioning pieces. As a result, there is a possibility that the peripheries of the through-holes or the positioning pieces suffer wrinkles or deformed portions. Accordingly, it is preferable that the optical sheets are supported with any one of their sides along their entire length.

Figure 6:
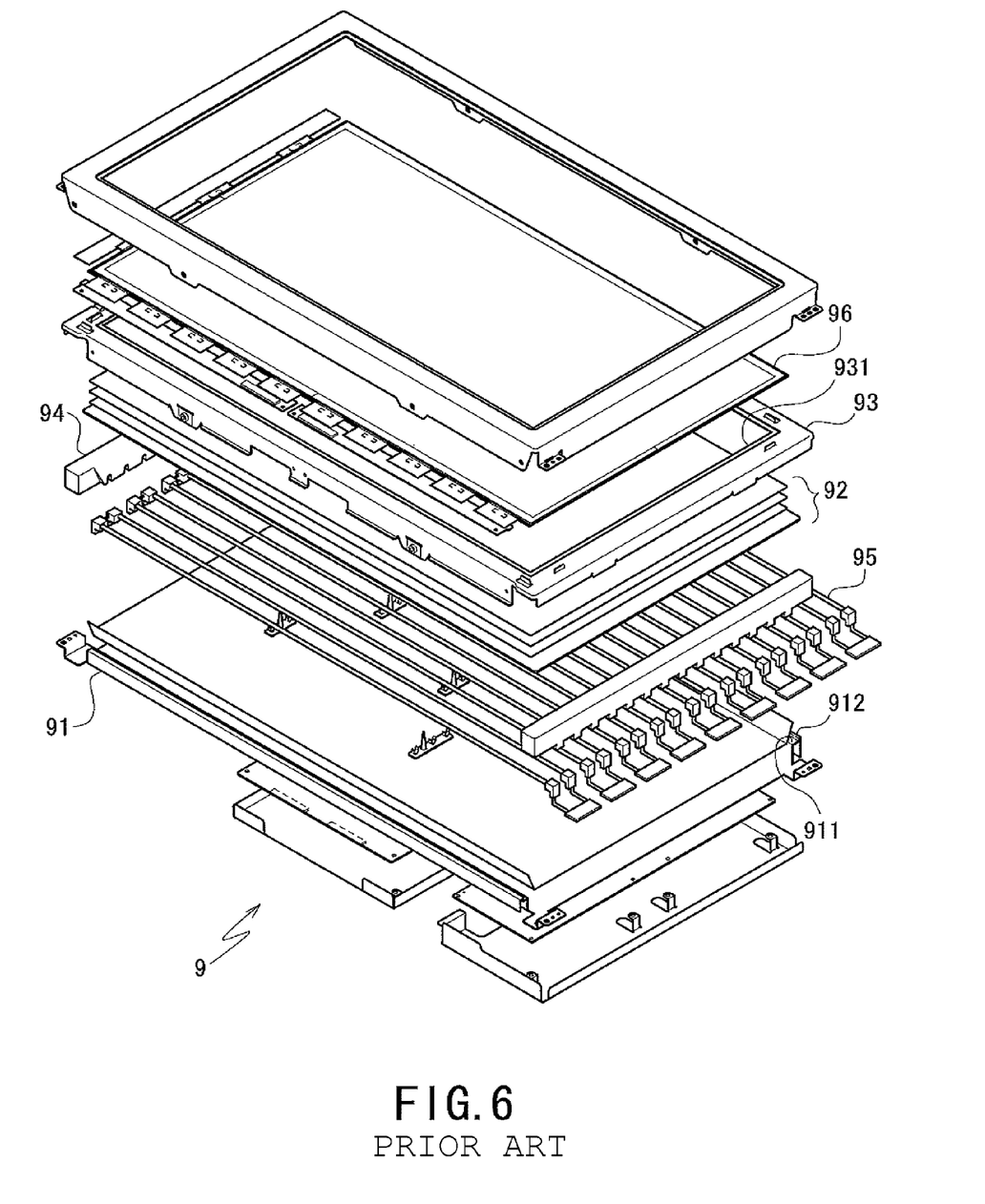
FIG. 6 is an exploded perspective view schematically illustrating a structure for assembling a conventional display device.

FIG. 6 is an exploded perspective view schematically illustrating a structure of a conventional display device in which optical sheets are supported with all the sides there around along almost their entire lengths. A display device 9 includes optical sheets 92 interposed between a display panel 96 and lamps 95 as a light source. A brief description only relating to supporting of the optical sheets 92 in the display device 9 will be provided. The optical sheets 92 are arranged so that edge portions thereof are on support surfaces 911 provided at edge portions of a chassis 91 and side holders 94, and a frame 93 is attached thereto from the front side. Stand walls 912 protruding toward the frame 93 are provided at outer sides of the support surfaces 911 of the chassis 91. Meanwhile, different-level surfaces 931 lowered toward the chassis 91 or the side holders 94 are provided at the inner edges of the frame 93. Then, the frame 93 is incorporated into the chassis 91 so that the different-level surfaces 931 fall in areas surrounded by the stand walls 912. Accordingly, the edge portions of the optical sheets 92 fit areas surrounded by the support surfaces 911 and the stand walls 912 of the chassis 91 or the side holders 94, and the different-level surfaces 931 of the frame 93.

If the display device 9 is used in a state of standing with its longer side placed as the lower side, the optical sheets 92 are apt to move downward due to their own weight so as to be brought to a state of being supported with the lower side thereof in contact with the stand wall 912 of the chassis 91. As described above, the optical sheets 92 are supported with their entire lower side, preventing the optical sheets 92 from being subjected to their own weight at a certain portion thereof.

However, if there is a gap between the chassis 91 and the frame 93, the lower side of the optical sheets 92 could get into the gap and the optical sheets 92 suffer deformation in some cases.

To prevent the optical sheets 92 from getting into the gap between the chassis 91 and the frame 93 and from suffering the deformation, narrowing or eliminating the gap between the stand wall 912 of the chassis 91 and the different-level surface 931 of the frame 93 can be considered. However, in order to place the different-level surfaces 931 of the frame 93 so as to fall into the areas surrounded by the stand walls 912 of the chassis 91, dimensional tolerance needs to be established to some extent in design, and narrowing the gap makes it difficult to place the frame 93. Further, it is necessary for the gap to accommodate a difference in volumes of deformation such as thermal deformation of the respective members. Accordingly, it is extremely difficult to narrow or eliminate the gap, realistically.

Meanwhile, examples of a structure for supporting optical sheets with all of their sides along the entire lengths include a structure for securing the optical sheets with their four sides so as to be surrounded from the front side and the back side and a structure for adhering the optical sheets with all of their sides to the frame or the chassis with double-faced tapes. These structures prevent the optical sheets from moving or from suffering deformation by securing all of their sides of the optical sheets, thereby preventing occurrence of wrinkles or deformed portions on the optical sheets. However, such structures have the following problems.

In the structure for securing the optical sheets with their four sides to the frame or other members, if thermal expansion occurs to the optical sheets and the frame due to heat generation in use and other reasons, forces are applied to the four sides of the optical sheets, the forces being unexpected due to a difference in coefficients of the thermal expansion of the optical sheets and the frame. As a result, the four sides of the optical sheets may suffer wrinkles or deformed portions. For example, a coefficient of thermal expansion of a synthetic resin material is generally higher by one digit or more than that of a metal material. Accordingly, if the optical sheets are made from the synthetic resin material and the frame is made from the metal material, the portions of the optical sheets with which the optical sheets are secured to the frame are prevented from thermally expanding during the time the temperature rises. Accordingly, the boundary between the portions with which the optical sheets are secured to the frame and portions with which the optical sheets are not secured to the frame develops a difference in deformation volumes, and the vicinity of the boundary results in occurrence of wrinkles or deformed portions.

Hence, a structure for supporting the optical sheets with all of their sides along the entire lengths while restraint on the respective sides is minimized is desired. However, if all the sides of the optical sheets are not restrained, the above-described problems arise and occurrence of wrinkles or deformed portions cannot be prevented.

SUMMARY OF THE INVENTION

In order to overcome the problems described above, preferred embodiments of the present invention provide a chassis for an illuminating unit, and an illuminating unit, a display device and a television receiver incorporating the chassis, and the chassis is such that optical sheets are supported in a state where their own weight and an external force are not concentrated at a certain portion of the optical sheets and occurrence of wrinkles or deformed portions can be prevented, or such that deformation due to falling-off of the optical sheets beyond a predetermined area can be prevented.

According to a preferred embodiment of the present invention, stand walls on which the lower sides of the optical sheets are to be placed so as to be in contact therewith are provided on sides of the chassis for an illuminating unit, and locking pieces capable of locking the lower side of the optical sheets are arranged so as to protrude from the stand wall on at least one of the sides of the chassis, the side being the lower side in a normal state in use.

It is also preferable that the stand walls are provided on all the sides around the chassis so that all the sides around the optical sheets can make contact with the stand walls, and the locking pieces capable of locking all the sides around the optical sheets are arranged so as to protrude from all the stand walls.

In this case, it is preferable that the locking pieces protruding from the stand walls are unitary molded with the stand walls. For example, if the stand walls are made from a metal plate material, the locking pieces are arranged so as to protrude from the stand walls by being subjected to press processing. If the stand walls are made from a synthetic resin material, the locking pieces are unitary molded with the stand walls.

In this case, if the stand walls are provided on at least two opposed sides of the chassis and the locking pieces are arranged so as to protrude from the stand walls, the edges of the locking pieces face each other. Here, it is preferable that the distance between the edges of the locking pieces facing each other is longer than the length of the optical sheets.

According to preferred embodiments of the present invention, if the illuminating unit or the display device is used in an upright position, the optical sheets are supported with their lower side along almost their entire length by the stand wall. Accordingly, the optical sheets are subjected to their own weight so that the weight is dispersed uniformly or almost uniformly on their lower side along their entire length, whereby the optical sheets can be prevented from suffering partial wrinkles or deformed portions thereon. In addition, the lower side of the optical sheets engages with the locking pieces provided to the stand wall and the optical sheets are prevented from falling off the stand wall, so that the optical sheets do not suffer wrinkles or deformed portions caused by falling-off of the optical sheets. Accordingly, applying the above-described chassis to a display device can prevent the occurrence of a shade or luminance irregularity on a screen, which may be caused by wrinkles or deformed portions on the optical sheets, thereby allowing the illuminating unit or the display device to be capable of high-definition display.

In addition, if the optical sheets are supported with their four sides in the manner described above, occurrence of wrinkles or deformed portions on the optical sheets are prevented even if the illuminating unit or the display device is oriented in any direction, that is to say, the illuminating unit or the display device is oriented with any one side thereof positioned so as to be the lower side. Accordingly, flexibility in use can be increased while display quality is maintained.

In addition, if the locking pieces are unitary molded with the chassis, a complex structure of the chassis is unnecessary. In addition, since it is unnecessary to add a process of forming the locking pieces to the production process of the chassis, an increase in production cost of the chassis is not caused.

In addition, if the distances between the edges of the locking pieces are longer than the length of the optical sheets, the optical sheets do not need to be deformed at the time of being incorporated into the chassis, which facilitates the incorporation and prevents the optical sheets from breaking at the time of the incorporation.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 3A and 3B are sectional views schematically illustrating a structure for supporting optical sheets in the illuminating unit according to a preferred embodiment of the present invention.

DETAILED DESCRIPTION OF PREFERRED EMBODIMENTS

A detailed description according to preferred embodiments of the present invention will now be provided with reference to the accompanying drawings. Here, the preferred embodiments preferably applied to an illuminating unit to be incorporated into a display device including a translucent liquid crystal display panel are described.

Figure 1:
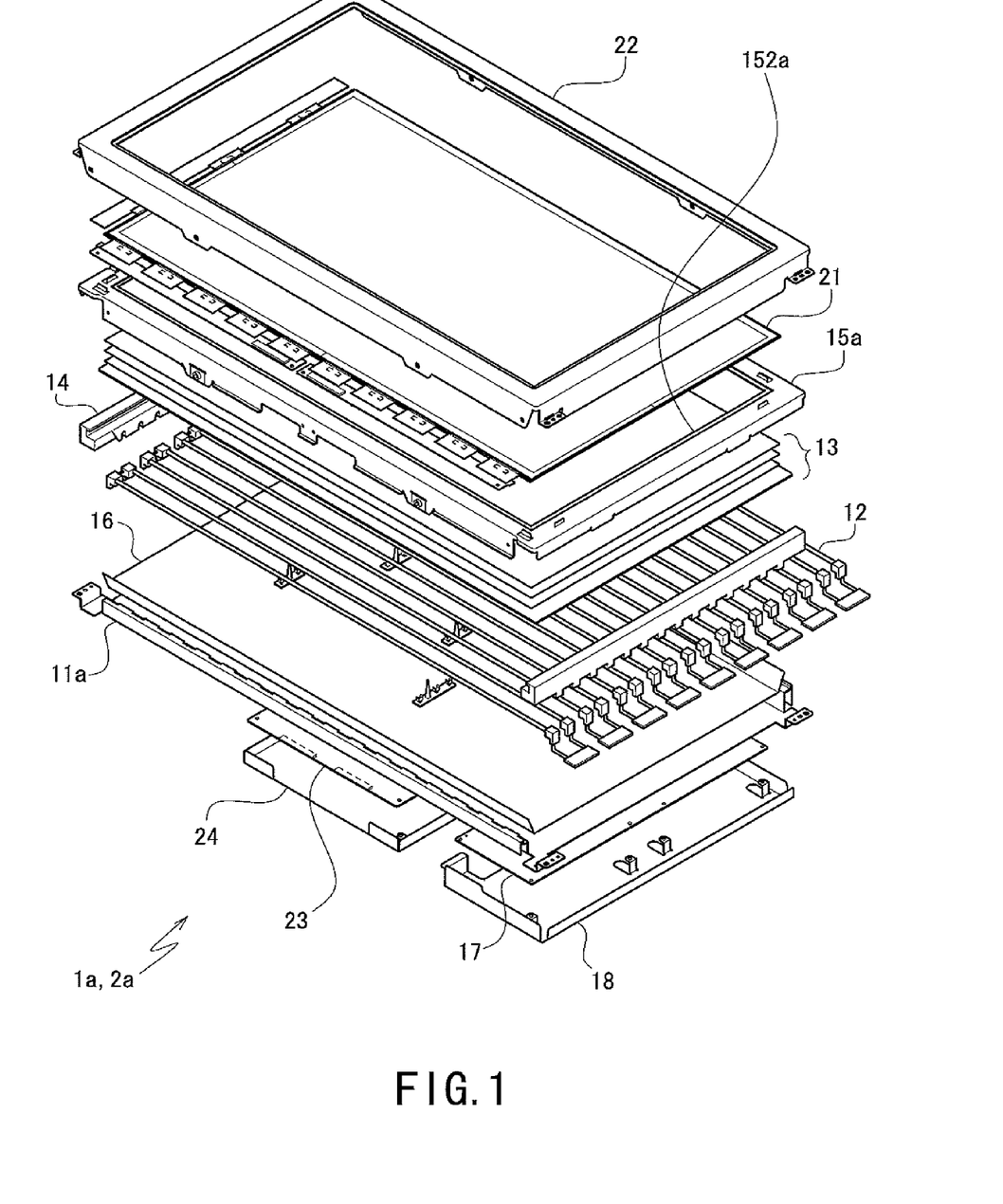
FIG. 1 is an exploded perspective view schematically illustrating a structure of a display device including an illuminating unit according to a preferred embodiment of the present invention.

FIG. 1 is an exploded perspective view schematically illustrating a structure for assembling a translucent liquid crystal display device which incorporates a chassis for an illuminating unit or an illuminating unit for a display device according to a preferred embodiment of the present invention. Incidentally, in FIG. 1, the illuminating unit for a display device and the display device are illustrated so that their front surfaces face toward the top of FIG. 1, and their back surfaces face toward the bottom of FIG. 1, based on which descriptions will be provided.

First, a brief description of an illuminating unit 1a for a display device according to the present preferred embodiment of the present invention will be provided with reference to FIG. 1. The illuminating unit 1a includes a backlight angle 11a that defines a chassis of the illuminating unit 1a, lamps 12 as a light source, optical sheets 13 arranged to control the properties of light emitted from the lamps 12, side holders 14 which function as spacers for the optical sheets 13, and a frame 15a having functions as preventing the optical sheets 13 from falling off. In addition, the illuminating unit 1a includes a reflection sheet 16 arranged to diffuse the light emitted from the lamps 12, a driving circuit board 17 which drives the lamps 12, and a driving circuit board cover 18 arranged to cover the driving circuit board 17.

A display device 2a according to the present preferred embodiment of the present invention includes, in addition to the illuminating unit 1a, a liquid crystal display panel 21 arranged to display an image, a bezel 22 arranged to secure the liquid crystal display panel 21 to the illuminating unit 1a, a control circuit board 23 which controls the liquid crystal panel 21, and a control circuit board cover 24 arranged to cover the control circuit board 23.

Next, a description of the backlight angle 11a that defines the chassis for the illuminating unit 1a and other members which constitute the illuminating unit 1a will be provided.

Figure 2A:
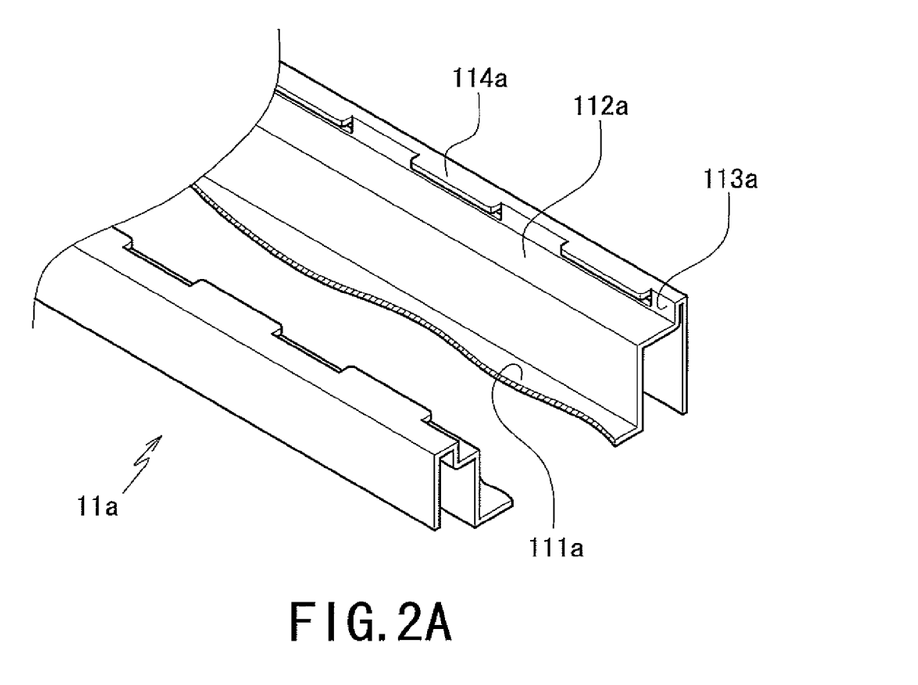
FIGS. 2A and 2B are partially enlarged views schematically illustrating a structure of a backlight angle of the illuminating unit.

The backlight angle 11a is a member which is preferably made from a metal plate material and has a substantially square flat shape by preferably subjecting the material to press processing. FIG. 2A is a partially enlarged view illustrating a part of the peripheral portions of longer sides of the backlight angle 11a. As shown in FIG. 2A, the peripheral portions of the longer sides of the backlight angle 11a are raised by bending so as to have a step-like shape facing toward a front surface of the backlight angle 11a. That is to say, support surfaces 112a parallel to a bottom surface 111a of the backlight angle 11a are provided as a step at a predetermined height from the bottom surface 111a.

Outer portions of the support surfaces 112a are raised by bending toward the front surface so as to provide stand walls 113a. The edges of the stand walls 113a are bent further outward, and locking pieces 114a are arranged so as to protrude inward from the longer sides of the backlight angle 11a. The manner of forming the locking pieces 114a is not limited. However, it is preferable to use the following manner. First, substantially U-shape cuts are made at positions where the locking pieces are to be formed. Then, the edges of the stand walls 113a are bent outward, and areas surrounded by the cuts are raised inward of the backlight angle 11a. Accordingly, the locking pieces 114a are unitary molded with the backlight angle 11a. Besides, preferable dimensions of the locking pieces 114a are described later.

Figure 2B:
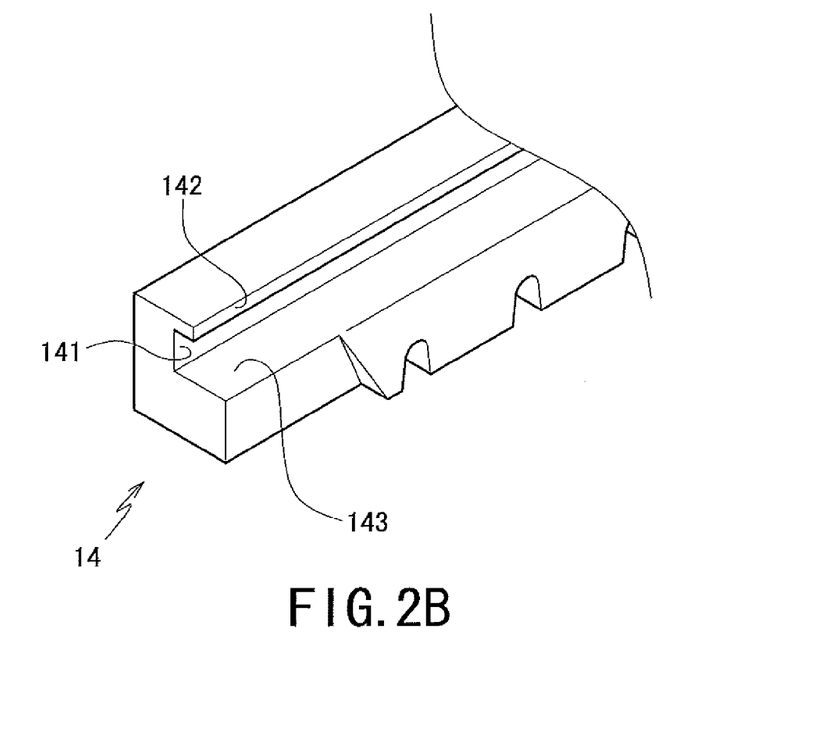

The side holders 14 are unitary molded members which are preferably made from a synthetic resin material and are substantially in the shape of a bar. FIG. 2B is an enlarged view illustrating an external view of the side holder 14. As shown in FIG. 2B, a support surface 143 on which the shorter side of the optical sheets 13 is to be placed is provided on the front surface of the side holder 14. A stand wall 141 standing toward the front surface along the length of the side holder 14 in the length direction is provided lateral to the support surface 143, and a locking piece 142 which protrudes from the top edge (i.e. the front surface) of the stand wall 141 is provided so that the locking piece 142 protrudes inward of the backlight angle 11a along the shorter side thereof when the side holder 14 is attached to the backlight angle 11a. Descriptions of other structures of the side holder 14 are omitted because the same structure as that of the conventionally used one can be applied.

Descriptions of the other members will be provided with reference to FIG. 1. The frame 15a is a member which is preferably made from a metal plate material and has a substantially square shape with an opening by preferably subjecting the material to press processing. Different-level surfaces 152a lowered toward a back surface of the frame 15a are provided at the inner edges of the frame 15a. In addition, the outer edges of the frame 15a are raised by bending toward the back surface, and accordingly, the respective edges of the frame 15a are substantially in the shape of a letter L in cross section.

For the optical sheets 13, the lamps 12, the reflection sheet 16, the driving circuit board 17 and the driving circuit board cover 18, conventional ones can be used. Brief descriptions thereof will be provided. The optical sheets 13 refer to members in the shape of a plate or sheet, or a set of members in the shape of a plate or sheet, which are arranged to control the properties of light emitted from the lamps 12. More specifically, the optical sheets 13 preferably are defined by a stack of a diffusion plate, a lens sheet and a diffusion sheet. For the lamps 12, fluorescent tubes such as cold cathode tubes and hot cathode tubes, and LEDs can be used. Besides, in FIG. 1, for the lamps 12, linear fluorescent tubes are preferably used. The reflection sheet 16 is a member in the shape of a sheet, which has surface properties of reflecting light diffusely. More specifically, the reflection sheet 16 is preferably made from an expanded PET (polyethylene terephthalate) material. The driving circuit board 17 is a circuit board in which a circuit which drives the lamps 12 is established. The driving circuit board cover 18 is a cover arranged to cover the driving circuit board 17, and is preferably made from a conductor such as a metal plate material.

For the liquid crystal display panel 21 and the control circuit board 23 which controls the liquid crystal display panel 21, a conventional translucent liquid crystal display panel and control circuit board can be used. Accordingly, detailed descriptions thereof are omitted. The bezel 22 is a member which is preferably made from a metal plate material and has a square shape with an opening by preferably subjecting the material to press processing. The control circuit board cover 24 is a cover arranged to cover the control circuit board 23, and is preferably made from a conductor such as a metal plate material by preferably subjecting it to press processing.

The structure for assembling the illuminating unit 1a including the above-described members is as follows.

The reflection sheet 16 is laid on a front surface of the backlight angle 11a, and the lamps 12 are arranged in parallel on a front surface of the reflection sheet 16. In this state, the side holders 14 are attached thereto so as to be in alignment with the shorter sides of the backlight angle 11a and to cover portions close to the ends of the lamps 12. The optical sheets 13 are placed on the support surfaces 112a of the backlight angle 11a and the support surfaces 143 of the side holders 14. The frame 15a is attached thereto from the front side.

The frame 15a and the backlight angle 11a are integrally combined with, for example, screws (not shown). Meanwhile, the optical sheets 13 are placed only with the edge portions at the sides around the optical sheets 13 on the support surfaces 112a of the backlight angle 11a and the support surfaces 143 of the side holders 14, and are not combined with the other members including the backlight angle 11a, the side holders 14 and the frame 15a.

The structure for assembling the display device 2a including the illuminating unit 1a is as follows. The liquid crystal display panel 21 is placed on the front surface of the illuminating unit 1a, and the bezel 22 is attached thereto from the front side. In addition, the control circuit board 23 and the control circuit board cover 24 are attached to a back surface of the backlight angle 11a.

The structure for assembling the optical sheets 13 in the illuminating unit 1a or in the display device 2a incorporating the illuminating unit 1a having the above-described structures is as follows.

Figures 3A, 3B:
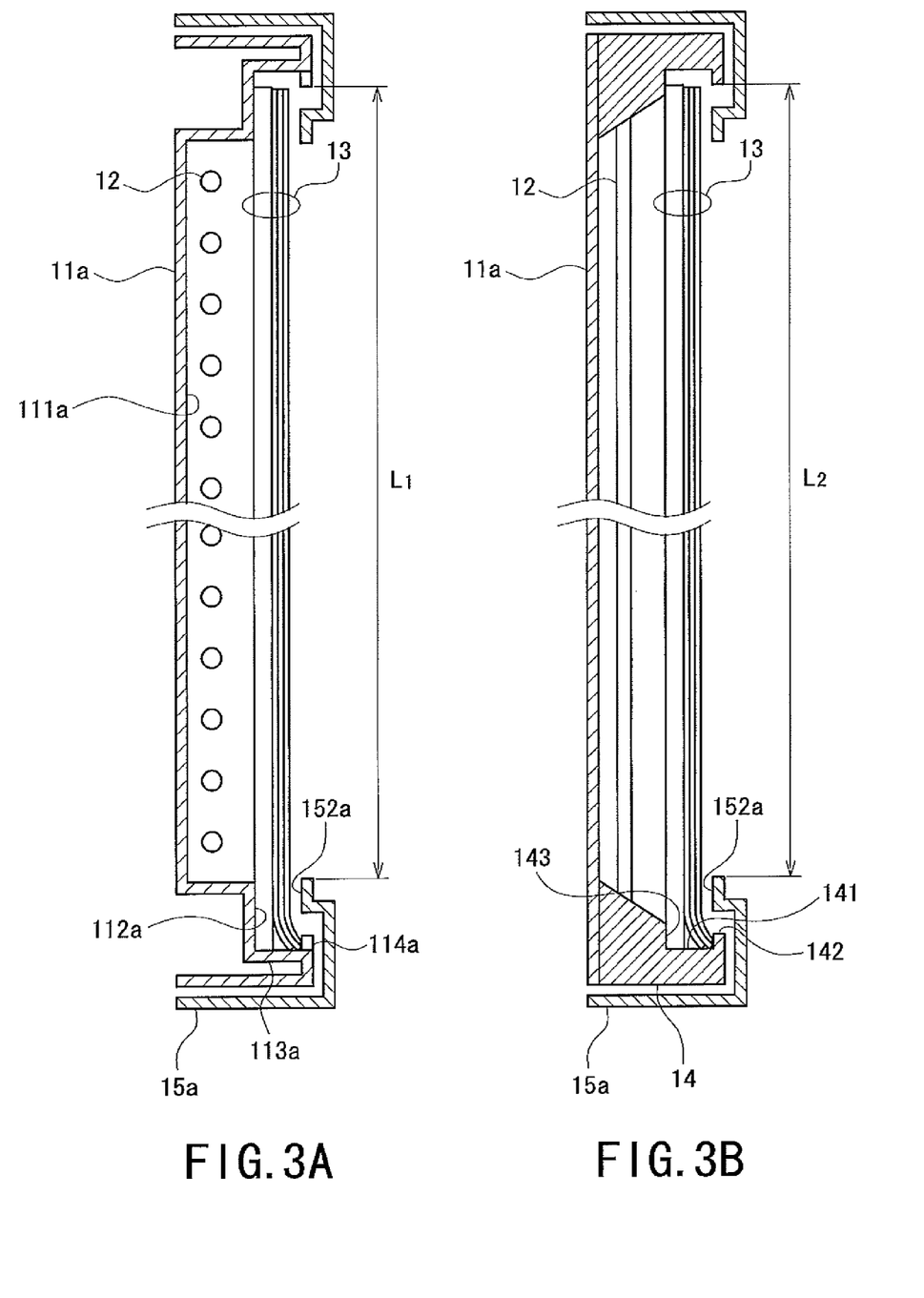
FIG. 3A illustrates the structure for supporting the optical sheets in longer sides of the backlight angle.
FIG. 3B illustrates the structure for supporting the optical sheets in shorter sides of the backlight angle.

FIGS. 3A and 3B are partial sectional views schematically illustrating the structure for supporting the optical sheets 13 in the illuminating unit 1a. FIG. 3A is the sectional view schematically illustrating the vicinities of edge portions at the longer sides of the illuminating unit 1a, which is sectioned perpendicularly to the longer side, and FIG. 3B is a sectional view schematically illustrating the vicinities of edge portions at the shorter sides of the illuminating unit 1a, which is sectioned perpendicularly to the shorter side.

As shown in FIG. 3A, the edge portions at the longer sides of the optical sheets 13 fit areas surrounded by the support surfaces 112a and the stand walls 113a of the backlight angle 11a, and the different-level surfaces 152a of the frame 15a. Since the optical sheets 13 are not secured to the other members, the optical sheets 13 are allowed to move within the surrounded areas.

If the optical sheets 13 stand in a nearly upright position with any one of their longer sides oriented as the lower side, the lower side of the optical sheets 13 makes contact with the stand wall 113a of the backlight angle 11a due to their own weight. Then, the sheets which are thin and easy to be deformed among the optical sheets 13, such as a lens sheet, a diffusion sheet and a polarizing reflection sheet, are deformed due to their own weight, and are apt to fall off the stand wall 113a by moving on the stand wall 113a toward the front surface thereof. However, since the locking pieces 114a are provided to the stand wall 113a, the lower side of the optical sheets 13 is locked by the locking pieces 114a, which prevents the optical sheets 13 from falling off. As a result, the optical sheets 13 are brought to a state of being supported with their lower side along their entire length by the stand wall 113a of the backlight angle 11a due to their own weight.

Besides, in order to reliably prevent the optical sheets 13 from falling off, it is preferable that the height of the locking pieces 114a protruding from the stand walls 113a is higher than at least the thickness of one of the optical sheets 13, and more preferable that the height of the locking pieces 114a is higher than the sum of the thicknesses of all the provided optical sheets 13. In addition, the locking pieces 114a protrude perpendicularly to the stand walls 113a in FIG. 3. However, it is also preferable that the locking pieces 114a incline some degrees toward the back side. Accordingly, the optical sheets 13 can be reliably prevented from falling off over the locking pieces 114a.

In addition, it is preferable that the locking pieces 114a having a predetermined length are provided at predetermined intervals respectively along the entire lengths of the longer sides of the backlight angle 11a. Accordingly, since the locking pieces 114a are provided respectively along the entire lengths of the longer sides of the backlight angle 11a as described above, occurrence of partial wrinkles or deformed portions on the lower side of the optical sheets 13 can be prevented.

As shown in FIG. 3B, the shorter sides of the optical sheets 13 fit areas surrounded by the support surfaces 143 and the stand walls 141 of the side holders 14, and the different-level surfaces 152a of the frame 15a. If the optical sheets 13 stand in the nearly upright position with any one of the shorter sides oriented as the lower side, the lower side of the optical sheets 13 makes contact with the stand wall 141 of the side holder 14 due to their own weight, and the sheets which are easy to be deformed among the optical sheets 13 are deformed due to their own weight and are apt to fall off the stand wall 141 of the side holder 14. However, the locking piece 142 provided to the stand wall 141 prevents the optical sheets 13 from falling off. As a result, the optical sheets 13 are brought to a state of being supported with their lower side along their entire length by the stand wall 141 of the side holder 14. Therefore, the same action and effect as obtained in the above-described case of supporting the optical sheets 13 with their longer side oriented as the lower side can be obtained.

Incidentally, in the present preferred embodiment, the locking pieces 142 are provided along the entire lengths of the stand walls 141 (see FIG. 1 or FIG. 2B), which is considered to be preferable from the view point of preventing wrinkles or deformed portions on the optical sheets 13. However, the locking pieces 142 do not always have to be provided along the entire lengths of the stand walls 141 as long as wrinkles or deformations can be prevented. For example, similarly to the locking pieces 114a provided on the longer sides of the backlight angle 11a, the locking pieces 142 having a predetermined length may be provided at predetermined intervals (see FIG. 2A).

According to the above-described structures, the optical sheets 13 are supported with their lower side along the almost entire length by the stand wall 113a or stand wall 141 in the upright position. Accordingly, it can be prevented that a force is concentrated at a certain portion on the optical sheets 13, which occurs in conventional optical sheets which hang through the holes, whereby the optical sheets 13 can be prevented from suffering wrinkles or deformed portions thereon. In addition, the optical sheets 13 can be prevented from falling off the stand wall 113a or the stand wall 141 by the locking pieces 114a or the locking piece 142, which can prevent wrinkles or deformed portions to be caused by deformation of the optical sheets 13 due to their falling-off.

In addition, the optical sheets 13 are not secured to the other members including the backlight angle 11a, the side holders 14 and the frame 15a. Accordingly, even if the temperature rises due to the heat generated from the lamps 12 and other causes in use, thermal deformation of the optical sheets 13 is not restrained by these members. Accordingly, the optical sheets 13 do not suffer wrinkles or deformed portions even in the case of thermal expansion.

As described above, according to the present preferred embodiment of the present invention, the illuminating unit for the display device can be provided which can prevent occurrence of a shade or luminance irregularity to be caused by wrinkles or deformed portions on the optical sheets 13, which allows high-definition display.

Incidentally, it is also preferable to provide at least one of the sides around the backlight angle 11a with the support surface 112a, the stand wall 113a and the locking pieces 114a, the side being oriented as the lower side in using the illuminating unit 1a or the display device 2a because the above-described action and effect can be obtained. In addition, it is also preferable to provide all the four sides around the backlight angle 11a with the support surfaces 112a, the stand walls 113a and the locking pieces 114a being arranged so as to be able to support the optical sheets 13 with all of their four sides because the optical sheets 13 are prevented from suffering wrinkles or deformed portions even if the optical sheets 13 are supported with any one of their sides oriented as the lower side in use, which allows high-definition display irrespective of a direction in which the illuminating unit 1a or the display device 2a is placed. Accordingly, flexibility of the illuminating unit 1a or the display device 2a in use is increased.

Incidentally, the edges of the locking pieces 114a provided to the stand walls 113a of the longer sides of the backlight angle 11a and the edges of the locking pieces 142 provided to the stand walls 141 of the side holders 14 face each other, respectively. In this case, it is preferable that the distance between the edges of the locking pieces 114 provided to the stand walls 113a of the longer sides of the backlight angle 11a, that is, the distance $L_1$ in FIG. 3A, is longer than the length of the shorter sides of the optical sheets 13. In addition, it is preferable that the distance between the edges of the locking pieces 142 provided to the stand walls 141 of the side holders 14, that is, the distance $L_2$ in FIG. 3B, is longer than the length of the longer sides of the optical sheets 13. With the above-described dimensional design, the optical sheets 13 do not need to be deformed when the optical sheets 13 are placed on the support surfaces 112a of the backlight angle 11a or the support surfaces 143 of the side holders 14, which facilitates the optical sheets 13 to be incorporated into the backlight angle 11a and the side holders 14.

Next, a description of another preferred embodiment of the present invention will be provided. In the present preferred embodiment, a backlight angle is unitary molded preferably from a synthetic resin material. Besides, in the following description, descriptions of the same structural components as those in the above-described preferred embodiment are omitted, and different respects are described mainly, providing the same reference numerals as those in the above-described preferred embodiment to the same structural components.

Figure 4:
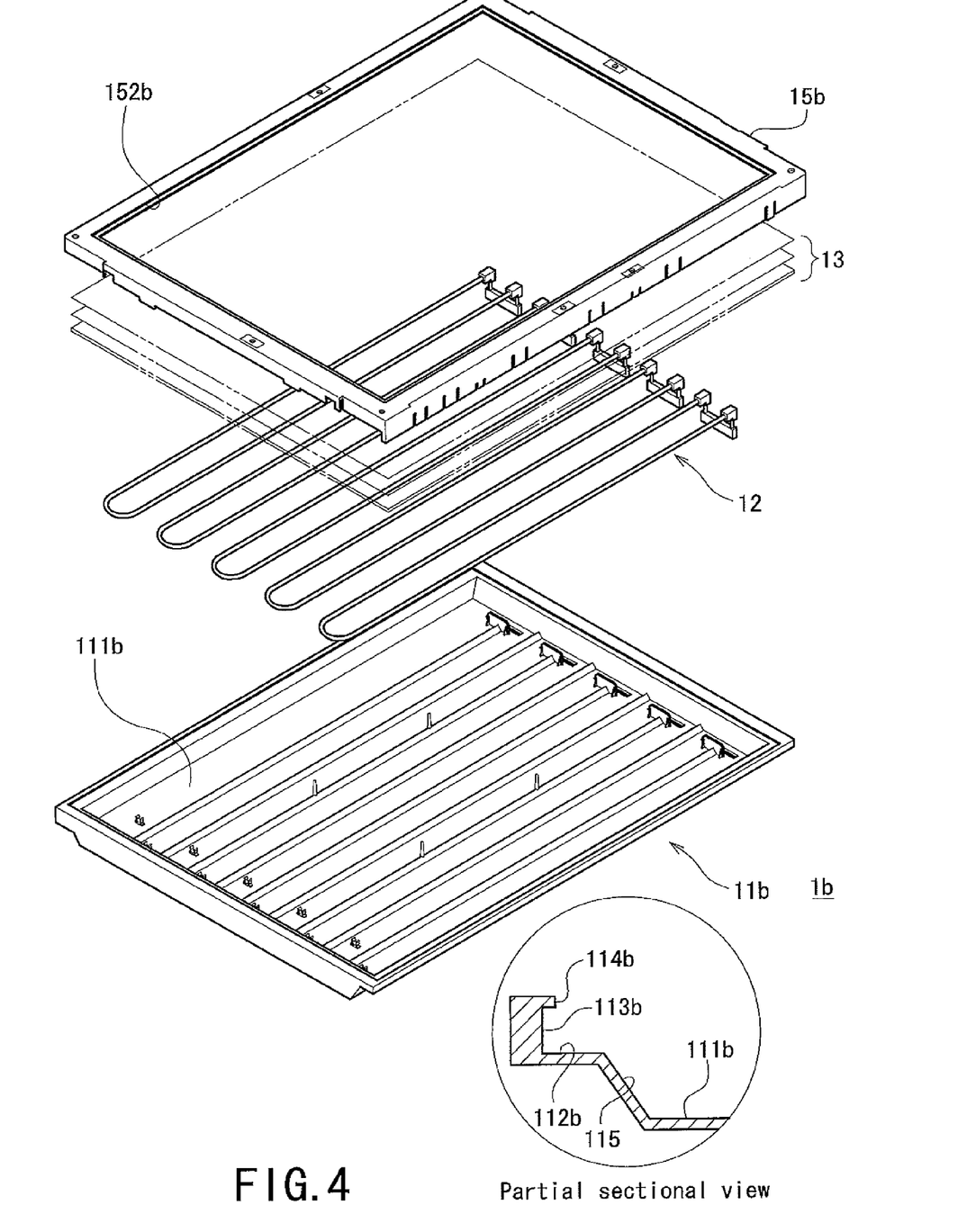
FIG. 4 is an exploded perspective view schematically illustrating a structure of an illuminating unit according to another preferred embodiment of the present invention.

FIG. 4 is an exploded perspective view schematically illustrating a structure for assembling an illuminating unit for a display device according to the present preferred embodiment of the present invention. In addition, shown in the circle in FIG. 4 is a partial sectional view schematically illustrating a structure of an edge portion of a backlight angle 11b.

First, a brief description of a structure of an illuminating unit 1b for a display device according to the present preferred embodiment of the present invention will be provided. The illuminating unit 1b includes the backlight angle 11b that defines a chassis of the illuminating unit 1b, lamps 12 as a light source, optical sheets 13 arranged to control the properties of light emitted from the lamps 12, and a frame 15b having functions as preventing the optical sheets 13 from falling off. In addition to these, the illuminating unit 1b includes a driving circuit board which drives the lamps 12 and a driving circuit board cover (not shown).

Next, members which constitute the illuminating unit 1b will be described.

The backlight angle 11b is a member which has a square shallow tray-like shape. The backlight angle 11b is unitary molded preferably from a synthetic resin material. Inclined planes 115 extending so as to be raised toward a front surface of the backlight angle 11b while inclined some degrees from a bottom surface 111b, and support surfaces 112b extending nearly parallel to the bottom surface 111b from the edges of the inclined planes 115 are provided to the edge portions at the respective sides around the backlight angle 11b. In addition, stand walls 113b are provided so as to stand toward the front surface from the edges of the support surfaces 112b, and locking pieces 114b protruding inward of the backlight angle 11b are provided in the vicinities of the edges of the stand walls 113b. In FIG. 4, the locking pieces 114b are arranged along the entire lengths of the stand walls 113b. However, it is also preferable that a plurality of the locking pieces having a predetermined length is formed at predetermined intervals. The reason for this is found in the description in the above-described preferred embodiment.

The frame 15b is a member which is preferably unitary molded from a synthetic resin material and has a substantially square shape with an opening. Different-level surfaces 152b lowered toward a back surface of the frame 15b are provided at inner edges of the frame 15b.

Incidentally, descriptions of the optical sheets 13, the lamps 12, the driving circuit board and the driving circuit board cover are omitted because the same members as in the above-described preferred embodiment can be applied to the present preferred embodiment.

The illuminating unit 1B including the above-described members are assembled as follows. The lamps 12 are placed on a front surface of the backlight angle 11b, and the optical sheets 13 are placed on the support surfaces 112b of the backlight angle 11b. Then, the frame 15b is attached thereto from the front side.

The frame 15b and the backlight angle 11b are combined and made difficult to separate. Meanwhile, the optical sheets 13 are placed only with the edge portions at the four sides around the optical sheets 13 on the support surfaces 112b of the backlight angle 11b, and are not secured to the other members.

A description of a display device 2b including the above-described illuminating unit 1b is omitted because a structure thereof and members incorporated therein are almost the same as the display device 2a in the above-described preferred embodiment.

Figure 5:
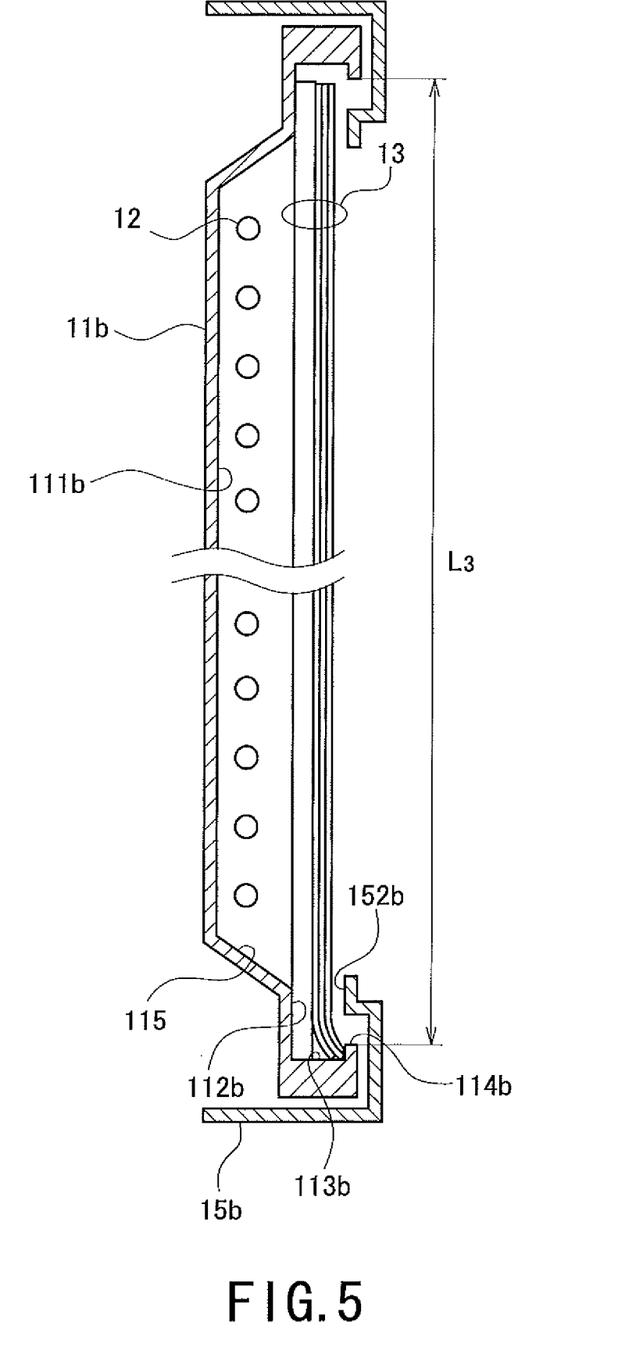
FIG. 5 is a sectional view schematically illustrating a structure for supporting the optical sheets in the illuminating unit according to another preferred embodiment of the present invention.

A structure for supporting the optical sheets 13 in the illuminating unit 1b is as follows.

FIG. 5 is a partial sectional view schematically illustrating relevant parts of the structure for supporting the optical sheets 13 in the illuminating unit 1b, and to be more specific, a sectional view schematically illustrating the vicinities of edge portions of the illuminating unit 1b which is sectioned perpendicularly to the sides of the illuminating unit 1b. Besides, the left of FIG. 5 is referred to as a back surface side of the illuminating unit 1b, and the right of FIG. 5 is referred to as a front surface side thereof.

As shown in FIG. 5, the edge portions at the respective sides of the optical sheets 13 fit areas surrounded by the support surfaces 112b and the stand walls 113b of the backlight angle 11b, and the different-level surfaces 152b of the frame 15b. Since the optical sheets 13 are not secured to the other members, the optical sheets 13 are allowed to move within the surrounded areas. When the optical sheets 13 stand on the lower side of the backlight angle 11b in the nearly upright position, the lower side of the optical sheets 13 makes contact with the stand wall 113b of the backlight angle 11b due to their own weight, and further, are apt to fall off the stand wall 113b. However, the lower side of the optical sheets 13 is locked by the locking piece 114b, preventing the optical sheets 13 from falling off. As a result, the optical sheets 13 are brought to a state of being supported with their lower side along their entire length by the stand wall 113b of the backlight angle 11b due to their own weight.

Therefore, the same action and effect as obtained in the above-described preferred embodiment can be obtained. In addition, concerning dimensions, a shape and a structure, the locking pieces 114b can be arranged to have the same ones as those of the locking pieces 114a in the above-described preferred embodiment. In addition, also concerning the distance L₃ between the edges of the locking pieces 114b facing each other, the locking pieces 114b can be arranged to have the same distance as the above-described preferred embodiment. As a result, the same action and effect as obtained in the above-described preferred embodiment can be obtained.

Figure 7:
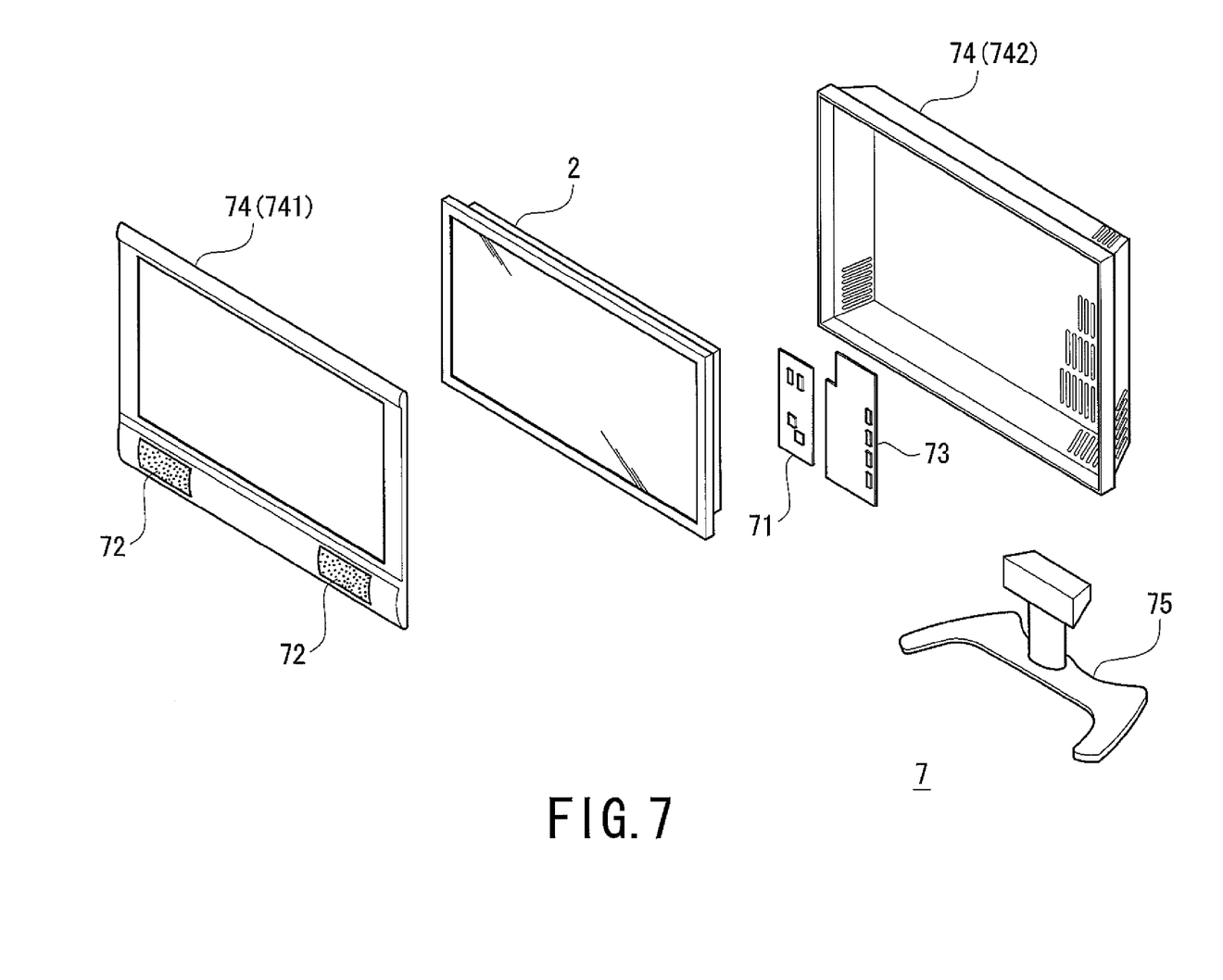
FIG. 7 is an exploded perspective view schematically illustrating components of a television receiver according to another preferred embodiment of the present invention.

Next, a brief description of a television receiver according to another preferred embodiment of the present invention will be provided. FIG. 7 is an exploded perspective view schematically illustrating components of the television receiver according to the present preferred embodiment of the present invention.

A television receiver 7 according to the present preferred embodiment of the present invention includes a tuner 71 arranged to generate a video signal and a sound signal of a designated channel from received radio waves, a display device 2 arranged to display an image based on the video signal generated by the tuner 71, a loudspeaker mechanism 72 arranged to emit a sound based on the sound signal generated by the tuner 71, and a power source 73 arranged to supply power to the tuner 71, the display device 2 and the loudspeaker mechanism 72.

A conventional terrestrial tuner (either one or both of an analog terrestrial tuner and a digital terrestrial tuner), BS tuner, and CS tuner can be preferably used as the tuner 71, and a conventional loudspeaker mechanism such as a common speaker can be used as the loudspeaker mechanism 72, so that detailed descriptions thereof are omitted. In addition, the display device 2a and the display device 2b which incorporate the illuminating unit according to the above-described preferred embodiments of the present invention preferably are used as the display device 2.

The display device 2, the tuner 71, the loudspeaker mechanism 72 and the power source 73 are housed in a cabinet 74 which is supported by a supporting member 75. In FIG. 7, the cabinet 74 includes a front-side cabinet 741 and a rear-side cabinet 742, between which the display device 2, the tuner 71, the loudspeaker mechanism 72 and the power source 73 are installed. Alternatively, the tuner 71, the loudspeaker mechanism 72 and the power source 73 may be installed in the display device 2.

The foregoing description of the preferred embodiments and the implementation example of the present invention has been presented for purposes of illustration and description with reference to the drawings. However, it is not intended to limit the present invention to the preferred embodiments, and modifications and variations are possible as long as they do not deviate from the principles of the present invention.

For example, in the above-described preferred embodiments, the locking pieces preferably are unitary molded with the backlight angle. However, the locking pieces may be attached separately to the backlight angle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An illuminating unit comprising:
   at least one lamp;
   at least one optical sheet arranged above the at least one lamp;
   a frame;
   a chassis; and
   at least one side holder provided on the chassis, the at least one side holder including:
      a portion in which at least one end portion of the at least one lamp is accommodated;
      at least one support surface on which the at least one optical sheet is placed;
      at least one stand wall arranged at an outer side of the at least one support surface; and
      at least one locking piece; wherein
   the at least one optical sheet is located in an area defined by the at least one support surface, the at least one stand wall and the at least one locking piece;
   the at least one side holder includes an opening or recess having a curved shape and arranged to accommodate an end portion of the at least one lamp; and
   the curved shape opening or recess and the end portion of the at least one lamp are arranged such that the end portion of the at least one lamp is capable of moving freely within the curved shape opening or recess when the illuminating unit is assembled.

2. The illuminating unit according to claim 1, wherein the illuminating unit includes opposing shorter sides and opposing longer sides and the at least one side holder is provided only at the shorter sides of the illuminating unit.

3. The illuminating unit according to claim 2, wherein the at least one side holder includes two side holders, each of the two side holders is provided at each of the opposing shorter sides of the illuminating unit.

4. The illuminating unit according to claim 1, wherein the at least one side holder includes a sloped portion arranged to face the at least one optical sheet.

5. The illuminating unit according to claim 1, wherein the curved shape opening or recess and the end portion of the at least one lamp are arranged such that the end portion of the at least one lamp is capable of moving freely within the curved shape opening or recess.

6. The illuminating unit according to claim 1, wherein the at least one support surface, the at least one stand wall, and the at least one locking piece are integral with each other and defined by a single unitary member.

7. The illuminating unit according to claim 1, wherein the at least one optical sheet is free to move within the area defined by the at least one support surface, the at least one stand wall and the at least one locking piece.

8. The illuminating unit according to claim 1, wherein the at least one lamp includes a plurality of lamps.

9. The illuminating unit according to claim 8, wherein the at least one side holder includes a plurality of portions each arranged to accommodate at least one end portion of each of the plurality of lamps.

10. The illuminating unit according to claim 8, wherein the at least one side holder includes a plurality of openings or recesses each having a curved shape and each arranged to accommodate at least one end portion of each of the plurality of lamps.

11. The illuminating unit according to claim 1, wherein the at least one side holder includes a sloped portion arranged to face the at least one optical sheet, and the opening or recess is provided at the sloped portion.

12. The illuminating unit according to claim 1, wherein the opening or recess has an upside down U-shaped configuration.

13. A display device comprising the illuminating unit according to claim 1.

14. A television receiver comprising the display device according to claim 13.

15. The illuminating unit according to claim 1, wherein the at least one side holder is a separate element from the chassis and the at least one side holder is attached to the chassis.

16. The illuminating unit according to claim 1, wherein the at least one side holder and the chassis are separate elements made of different materials.

17. The illuminating unit according to claim 16, wherein the at least one side holder is made of resin and the chassis is made of metal.

18. The illuminating unit according to claim 1, wherein the at least one side holder has a bar-shaped configuration.

19. The illuminating unit according to claim 1, wherein the at least one lamp has a longest length extending in a first direction, and the at least one side holder has a longest length extending in a second direction that is perpendicular or substantially perpendicular to the first direction.

20. The illuminating unit according to claim 1, wherein the at least one support surface, the at least one stand wall, and the at least one locking piece define a trench or groove, and an end portion of the at least one optical sheet is accommodated in the trench or groove.

* * * * *